June 15, 1965 P. E. SCHMIDT 3,188,877
ANTIFRICTION BEARING WORM AND GEAR MECHANISM
Filed June 17, 1963 2 Sheets-Sheet 1

INVENTOR.
PAUL E. SCHMIDT
BY
ATTORNEY

June 15, 1965  P. E. SCHMIDT  3,188,877
ANTIFRICTION BEARING WORM AND GEAR MECHANISM
Filed June 17, 1963  2 Sheets-Sheet 2

INVENTOR.
PAUL E. SCHMIDT
BY Ronald W. Mayes
ATTORNEY

United States Patent Office 3,188,877
Patented June 15, 1965

1

3,188,877
ANTIFRICTION BEARING WORM AND GEAR MECHANISM
Paul E. Schmidt, Wichita, Kans., assignor to The Boeing Company, Wichita, Kans., a corporation of Delaware
Filed June 17, 1963, Ser. No. 288,304
7 Claims. (Cl. 74—425)

This invention relates to improvements in mechanical power transmitters and more particularly to antifriction bearing worm and gear mechanisms.

An object of this invention is the provision of a novel, reliable, and efficiently operating antifriction bearing worm and gear mechanism.

Another object of this invention is the provision of a novel and reliable antifriction bearing worm and gear mechanism that has a minimum number of parts, requires a minimum of lubrication, can be fabricated at relatively small expense, and is durable in construction.

A still further object of this invention is the provision of a novel and reliable antifriction ball bearing worm and gear mechanism having slack adjusting means carried by the gear for preventing jamming of the gear and worm due to the displacement of one or more of the antifriction ball bearings.

Yet another object of this invention is the provision of a novel antifriction ball bearing worm and gear mechanism having means for assuring that the antifriction ball bearings are resiliently urged into a fully seated and operative relationship between the worm and gear at the point of tangency thereof for maximum power transmission and optimum mechanical efficiency of the gear assembly entirely throughout the speed ranges in which the gear assembly is intended to be operated.

The invention further resides in certain novel features of construction, combinations, and arrangements of parts, and further objects and advantages of the invention will be apparent to those skilled in the art to which it pertains from the following description of the present preferred embodiment thereof described with reference to the accompanying drawings, which form a part of this specification, wherein the same reference numerals indicate corresponding parts throughout several views, and in which.

Figure 1:
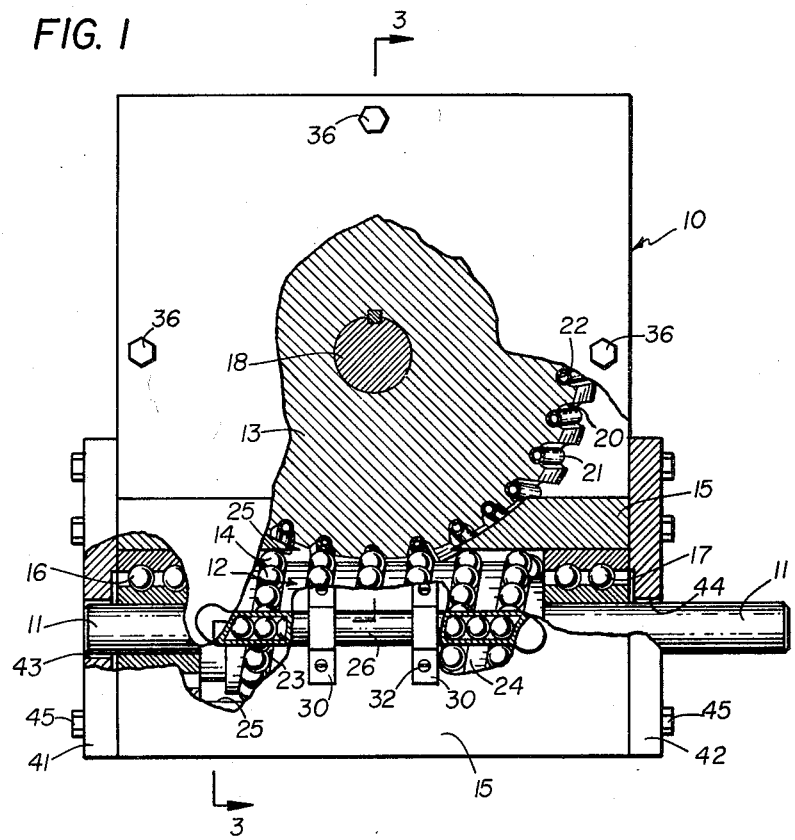
FIG. 1 is a side elevational view, with parts broken away and in section, of an antifriction worm and gear mechanism embodying the invention.

It is to be understood that the invention is not limited to the details of construction and the arrangements of parts shown in the drawings and hereafter described in detail, but is capable of being otherwise embodied and of being practiced and carried out in various ways. It is to be further understood that the terminology employed herein is for the purpose of description and there is no intention to herein limit the invention beyond the requirements of the prior art.

Figure 3:
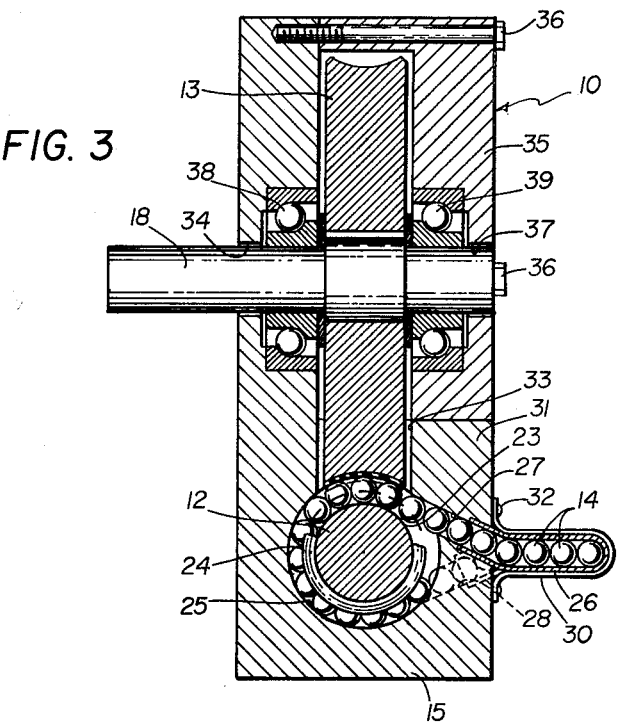
FIG. 3 is an enlarged sctional view along line 3—3 in FIG. 1.

Referring to FIG. 1, a power transmitting mechanism embodying the invention is indicated generally by the reference numeral 10. The mechanism 10 comprises a power input shaft 11 having an antifriction worm 12 connected thereto. A gear 13 is preferably driven by the worm 12 through an interconnecting power transmitting antifriction means comprising recirculating antifriction bearing balls 14. The worm 12 is journaled in a housing 15 by means of two coaxial double row ball bearing assemblies 16 and 17. The gear 13 is keyed to an output shaft 18 journaled in the housing 15. The housing 15 has a generally J-shaped cross section as seen in FIG. 3. The gear 13 has a plurality of helical and substantially semicylindrical ball receiving recesses 20 preferably wide enough to permit at least two power transmitting balls 14 to be seated therein and drivingly engage the gear 13. It is understood that the recesses 20 may be wide enough to accommodate only one ball 14, but this would shorten the useful wear life of the gear 13.

Slack adjusting, vibration damping, and noise reducing tubular members 21, of flexible and resilient material, are each seated and fixed into a substantially semicylindrical recess 22. One recess 22 is formed in and coextensive with the bottom of each ball receiving recess 20. The recesses 20 and 22 have centers that are coincidental with radii of the gear 13, FIG. 3. The recesses 20 have central axes that define a cylinder having a center coincidental with the common center of revolution of the gear 13 and the output shaft 18. The tubular members 21 preferably extend the length of the recesses 20 and 22 and lie in a circle that is concentric within a circle defined by the recesses 20.

Figure 2:
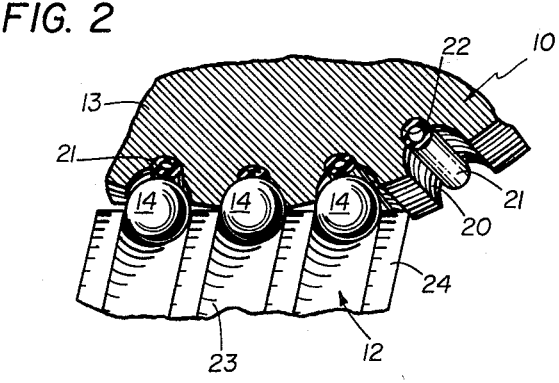
FIG. 2 is an enlarged fragmentary side elevational view of a portion of the antifriction worm and gear of FIG. 1 in fully engaged and power transmitting position at the point of tangency thereof.

The members 21, in addition to their important functions as slack adjusters, vibration dampers, and noise reducers, also function to prevent jamming of the balls 14 between the gear 13 and the worm 12 at the point of tangency thereof, FIG. 2. The resilient member 21 is adapted to be compacted within its seating recess 22 when compressed by a pair of balls 14 at or near the point of tangency. As seen in FIG. 3, the radius of the recess 20 is large enough to receive the balls 14. The width of the worm groove or inner ball race 23, defined by the lead of the helical worm tooth 24, is great enough to permit each ball 14 to be received therein in substantially frictionless contact therewith. The balls 14 ride in their inner race 23 as defined by the continuous helical tooth 24 and of the worm 12. The inner race 23 is a groove in the worm 12 having a semicircular cross section.

Except for the presence of the slack adjusting member 21, jamming could normally be expected to occur at the point of tangency illustrated in FIG. 3 where the outer ball race, as defined by the cylindrical wall 25 of the bore occupied by the worm 12 in the housing 15, is discontinued. Another important advantage of the presence of the slack adjusters 21 is that the ball recesses 20 in the gear 13 need not be of the precise dimensions formerly required by other worm gear mechanisms for reliable operation.

The outer ball race in addition to the outer cylindrical wall 25 of the housing 15, is comprised of a tubular ball retainer 26 for providing a recirculating ball conduit, FIG. 3. This is necessary to provide means by which the balls 14 can be returned to the opposite end of the worm 12 after traveling the helical path along the length of the worm 12. As seen in FIG. 3, if the worm 12 is turned in a clockwise direction about its turning axis, the balls 14 are fed through a cylindrical exit passage 27 formed in the housing 15, into the retainer 26, and back into the housing 15 into the inner race 23 of the worm 12 via a cylindrical return passage 28. However, if the worm 12 is turned in a counterclockwise direction, FIG. 3, the direction of travel of the balls 14 is reversed. The passage 28 becomes the exit passage, and the passage 27 becomes the return passage. The retainer 26 is held in place by a pair of laterally spaced U-shaped clips or brackets 30. The brackets 30 are secured to an upright rectangular leg or plate 31 of the housing 15 by suitable fastening means, such as screws 32. The outer ends of the passages 27, 28 are counterbored to slidably receive the terminal ends of the retainer 26. The ends of the retainer 26 are bent to an angle of approximately thirty degrees from the horizontal, FIGS. 1 and 3. Sharp corners and bends are avoided for the smooth easy flow of the balls 14 during the circulation thereof.

The assembling of the mechanism 10 is relatively simple and readily accomplished. The worm 12 is inserted into the outer ball race 25 of the housing 15. The double race ball bearing assemblies 16, 17 are pressed over the ends of the shaft 11 extending beyond the worm 12 and into corresponding ends of the cylindrical outer race 25 formed in the bight of the J-shaped housing 15. The gear 13 and its shaft 18 are inserted into the housing 15 with the gear 13 occupying a cylindrical housing recess 33 and with the shaft 18 extending through a drill hole 34 in a housing slide wall, FIG. 3. An L-shaped cover plate 35 for enclosing the gear 13 is then secured to the housing 15 by suitable fastening means such as screws 36. The terminal end of the output shaft 18 is disposed in a drill hole 37 formed in the cover plate 35. Both of the long upright legs of the housing 15 and the cover plate 35 are each counterbored coaxially with the drill holes 34 and 37 for the insertion of a single row antifriction ball bearing assemblies 38, 39, respectively. The output shaft 18 is journaled in the bearing assemblies 38, 39 on either side of the gear 13. Cover plates 41 and 42 in FIG. 1 are disposed over the protruding ends of the input shaft 11 and over the bearings 16 and 17, respectively, at opposite ends of the worm 12. The plates 41, 42 are alike and oppositely disposed. The plates 41, 42 have central openings 43, 44 to accommodate the extension of the input shaft 11 therethrough. Screws 45 are used to screw the plates 41, 42 into place. The plates 41, 42 serve as dust covers for the bearing assemblies 16, 17, respectively.

Before the retainer 26 is attached to the leg 31 of the housing 15 with the brackets 30 and the screws 32, the worm groove 23 and the retainer 26 are fully loaded with the balls 14. Then the retainer 26 is fixed in place on the outside of the leg 31 of the housing 15 adjacent to the cover plate 35.

It will be understood that this invention can be modified to adapt it to various circumstances and conditions, and it is accordingly desired to comprehend within the purview of this invention such modifications as may be considered to fall within the scope of the appended claims.

What is claimed is:

1. An antifriction gearing mechanism comprising,
a worm having at least one helical groove formed in the periphery thereof,
ball retaining means connected to said worm, said groove and said retaining means cooperating to define an helical ball channel,
a plurality of balls in said channel,
a gear having helical recesses formed in the periphery thereof spaced apart a distance equal to the lead of said worm groove, said balls engaging said gear in said recesses for transmitting rotative motion to said gear from said worm, and
slack adjusting means carried in the bottom of each of said gear recesses for engaging said balls and urging said balls into said worm groove when said balls enter said recesses of said gear.

2. In a device of the character described,
an elongated body member formed with an helical groove extending lengthwise thereof,
antifriction elements adapted to circulate within said body member groove,
means enclosing said body member and extending lengthwise thereof retaining said antifriction elements within said body member groove,
antifriction element return means fixed to said enclosing means and connected to the ends of said body member groove,
a gear having helical recesses formed in the periphery thereof spaced apart a distance equal to the lead of said body member groove, and
slack adjusting means carried by said gear in each of said recesses adapted to engage and urge said antifriction elements against said body member at the point of power transmission between said body member and said gear.

3. In a device of the character described,
an elongated body member formed with an helical groove extending lengthwise thereof,
return means connected to the ends of said groove, antifriction elements adapted to circulate within said groove and said return means,
housing means disposed about said body member and extending lengthwise thereof for retaining said antifriction elements within said groove,
a gear having helical recesses formed in the periphery thereof spaced apart a distance equal to the lead of said groove in said body member, and
slack adjusting means carried by said gear in a plurality of said recesses adapted to engage and urge said antifriction elements against said body member at the point of power transmission between said body member and said gear.

4. In a device as set forth in claim 3, wherein said slack adjusting means comprise flexible tubular segments.

5. In a device of the character described,
a worm having an helical groove extending lengthwise thereof,
antifriction ball elements,
housing means encircling said worm and extending lengthwise thereof for retaining said antifriction ball elements within said groove,
ball return means connected to the ends of said groove,
a gear having recesses formed in the periphery thereof spaced apart a distance equal to the lead of said groove, and
slack adjusting means carried by said gear in each of said recesses adapted to engage and urge said antifriction elements against said worm at the point of power transmission between said worm and said gear.

6. In a device as set forth in claim 5, wherein said recesses of said gear and said slack adjuster means therein are large enough to accommodate the contact two antifriction ball elements at the point of power transmission.

7. An antifriction gearing mechanism comprising,
a J-shaped housing having a cylindrical bore at the bight thereof,
a worm having an helical groove formed in the periphery thereof disposed in said housing cylindrical bore,
cylindrical input shaft means coaxially connected to the ends of said worm,
antifriction means journaling said shaft means in said housing,
ball retaining means connected to said housing, said housing having passageways connecting said ball retaining means with said groove,
a plurality of balls in said groove and said ball retaining means and said connecting passageways,
a gear having helical recesses of arcuate cross section formed in the periphery thereof spaced apart a distance equal to the lead of said groove,
said balls engaging said gear in the arcuate recesses thereof for having rotative motion transmitted thereto from said worm, flexible slack adjusting means of arcuate cross section carried in an arcuate recess formed in the bottom of each of said gear recesses for engaging said balls and urging said balls into said worm groove when said balls enter said gear recesses and bear against said flexible slack adjusting means, output shaft means carried by said gear and having one end journaled in one leg of said J-shaped housing, an L-shaped housing cover having another end of said output shaft means journaled therein, said L-shaped housing cover being connected to said J-shaped housing, said J-shaped housing and said L-shaped housing cover together having the general appearance of a rectangular solid, and dust cover means covering said antifriction means.

References Cited by the Examiner
UNITED STATES PATENTS

| | | | |
|---|---|---|---|
| 2,664,760 | 1/54 | Booth | 74—458 |
| 2,682,176 | 6/54 | Fagley et al. | 74—458 |

FOREIGN PATENTS

| | | |
|---|---|---|
| 1,261,122 | 4/61 | France. |

DON A. WAITE, *Primary Examiner.*